United States Patent [19]
Forster

[11] Patent Number: 5,286,057
[45] Date of Patent: Feb. 15, 1994

[54] COMFORT FEATURE

[76] Inventor: Lloyd M. Forster, 1827 Golf Ridge Dr., Bloomfield Hills, Mich. 48013

[21] Appl. No.: 940,757

[22] Filed: Sep. 8, 1982

Related U.S. Application Data

[63] Continuation-in-part of Ser. No. 779,142, Oct. 21, 1991, abandoned, Ser. No. 560,227, Jul. 24, 1990, abandoned, Ser. No. 465,637, Jan. 22, 1990, abandoned, and Ser. No. 317,754, Mar. 2, 1989, abandoned.

[51] Int. Cl.$^5$ .............................................. B60R 22/00
[52] U.S. Cl. .................................... 280/808; 297/483; 188/65.1; 242/107.2
[58] Field of Search ............... 280/808, 806, 805, 801; 242/107.2; 297/483, 470, 473; 188/65.1; 24/170, 191, 171

[56] References Cited

U.S. PATENT DOCUMENTS

| | | | |
|---|---|---|---|
| 598,776 | 2/1898 | Gosnell et al. | 188/65.1 |
| 887,344 | 5/1908 | Nelson | 188/65.1 |
| 2,933,157 | 4/1960 | Huber | 188/65.1 |
| 3,719,972 | 3/1973 | Klink | 280/807 |
| 3,995,885 | 12/1976 | Plesniarski | 297/483 |
| 4,310,175 | 1/1982 | Pickett | 242/107.2 |
| 4,422,593 | 12/1983 | Takada | 188/65.1 |
| 4,452,470 | 6/1984 | Doty | 280/808 |
| 4,484,766 | 11/1984 | Buchmeier | 242/107.2 |
| 4,547,018 | 10/1985 | Cunningham | 280/808 |
| 4,549,769 | 10/1985 | Pilarski | 297/483 |
| 4,682,791 | 7/1987 | Ernst | 280/806 |
| 4,826,250 | 5/1989 | Ibanez | 280/808 |
| 5,054,815 | 10/1991 | Gavagan | 188/65.1 |

FOREIGN PATENT DOCUMENTS

| | | | |
|---|---|---|---|
| 385232 | 9/1990 | European Pat. Off. | 280/801 |
| 176521 | 10/1906 | Fed. Rep. of Germany | 242/107.2 |
| 2813533 | 10/1979 | Fed. Rep. of Germany | 280/801 |
| 2494996 | 6/1982 | France | 280/801 |
| 2612137 | 9/1988 | France | 280/808 |
| 2627731 | 9/1989 | France | 280/801 |
| 63-71453 | 3/1988 | Japan | 280/808 |
| 1531415 | 11/1978 | United Kingdom | 280/808 |

Primary Examiner—Karin L. Tyson
Attorney, Agent, or Firm—Lloyd M. Forster

[57] ABSTRACT

Comfort feature method and apparatus providing fictional resistance to retraction of the static loop of an automotive vehicle emergency inertia responsive shoulder belt retractor system. A light comfortable back tension imposed by shoulder belt engagement contact with the occupant is sufficient to initiate self-energized frictional resistance to arrest relatively heavy tension retraction without preventing belt retraction to an occupant contact or completely retracted condition upon any slack arising from occupant movement belt disengagement.

16 Claims, 6 Drawing Sheets

COMFORT FEATURE

This application is a continuation-in-part of previously copending applications: Ser. No. 07/317,754 filed on Mar. 2, 1989 now abandoned; Ser. No.: 07/465,637 filed on Jan. 22, 1990 now abandoned; Ser. No. 07/560,227 filed on Jul. 24, 1990 now abandoned; and Ser. No.: 07/779,142 filed on Oct. 21, 1991, now abandoned.

BACKGROUND OF THE INVENTION

Automotive vehicles equipped with shoulder belt retractors, particularly in the United States, include "comfort feature" means for relieving uncomfortable retraction belt tension on the occupant. Typically, a shoulder belt retractor includes a coiled spring actuated wind-up reel for the belt webbing which passes through a static loop mounted on the vehicle door pillar above occupant's shoulder from which the belt extends across the chest of the occupant to a buckle latch at an inside anchor point. Upon reaching a sitting position with engagement of the shoulder belt retacted under wind-up belt tension, the comfort feature enables the occupant to manually extract the belt to a loosened condition upon which a latch in the retractor mechanism locks the belt against retraction. Such comfort feature is desirable to relieve the occupant from uncomfortable shoulder belt retraction force which often deters an occupant from using the shoulder belt with its safety advantages.

Extraction of the shoulder belt against the retractor spool wind-up spring is normally permitted in an emergency locking retractor having an inertia responsive locking system against extraction. Accordingly, extraction can be accommodated not only to initially secure the belt buckle, as in a nonpassive manual system, but also permits the occupant to move away from the seat back, as when the driver reaches into the glove compartment or otherwise. This has necessitated a sophisticated comfort feature locking mechanism which will cause release of the comfort feature locking mechanism from an overextended extraction subject to manual resetting upon return to normal sitting position.

Typical functional requirements established by a United States Automotive Vehicle manufacturer are as follows:

Comfort Features for Emergency Locking Retractors

Functional Requirements

1. The comfort lock feature must function as follows:
 a) Extend the webbing from the retractor to the working range of the belt (distance indicated on each retractor assembly drawing.)
 b) Let the belt retract a minimum of 6 inches (153 MM).
 c) Extract the belt 1.2 inches (31 MM) maximum and release belt. The comfort lock must engage to prevent retraction.
 d) Extract belt 4 inches (102 MM) and release. The belt must return to within 1.0 inch (25 MM) of the comfort lock position previously set. Full retraction is a failure of the system.
 e) Extract belt 6 inches (153 MM) and release. The belt must fully retract without locking.

Notwithstanding such requirements and manufacturing compliance therewith, possibilities of malfunction have led to additional provisions. For example, if the buckle is disengaged while the comfort feature continues to lock the retractor against belt retraction, the loose belt may hang out of the vehicle when the door is opened for occupant exit and left dangling when the door is shut—even after reentry if the belt is not manually actuated to retraction mode. In order to solve this problem, door opening responsive mechanism has been added to release the comfort feature belt locking mechanism when the door is opened; or in an alternative system when the belt is loose from disengagement.

Notwithstanding the incorporation of effective mechanisms involved in meeting the foregoing functional requirements, including door opening or buckle disengagement release of the comfort feature locking mechanism, possibilities of malfunction have continued to persist in "state-of-the-art" retraction systems in use at the present time. For example, if the driver should reach for the glove compartment on the passenger side, extracting the belt beyond the comfort feature range, (6 inches in the above specification) the belt must fully retract without locking upon the driver's return to the seat back position and, in most cases, the retraction system will so function subject to resetting the comfort feature when the occupant is in driving position. However, should the driver hesitate, after partial return from reaching the glove compartment sufficiently to restore the comfort feature mode of operation, and then reach back less than 6 inches, an inadvertent comfort feature relocking may occur with the belt in an excessively loose condition which, if not observed and remedied by the driver, may effectively disable the shoulder belt restraint system and result in an unexpected driving hazard. This current problem is sufficiently serious that consideration is being given to entirely eliminating the comfort feature in future models, notwithstanding its desirability for occupant comfort and inducement to shoulder belt use.

Another limitation of current comfort feature systems in use results from excessive manual loosening beyond the extent necessary to relieve uncomfortable belt tension against the occupant's body. Surveys have shown that a majority of comfort feature users extract the belt beyond the necessary comfort position and thereby at least partially reduce the effectiveness of the shoulder belt system as a safety provision.

Recent implementation of passive shoulder belt retraction systems, for example with door mounted retractors which permit occupants to enter and exit without manual buckling and unbuckling, render minimum extension of the shoulder belt for comfort even more critical since additional belt webbing is involved in the passive restraint systems subject to an extra degree of stretching upon emergency inertia locking.

As an alternative approach to relieving uncomfortable shoulder belt tension, prior art includes blocking clips which, after shoulder belt connection by the occupant, may be moved into blocking contact with the static loop while the belt is manually held with sufficient body clearance to be comfortable with complete blocking of further belt retraction by static loop engagement.

Such solution is subject to the basic objection of "window shade" comfort feature which caused the discontinuance in 1990—the dangerous possibility of latching with excessive slack. While sophisticated mechanisms to meet industry specifications, such as stated herein, automatically minimized the possibility of excessive slack, there is no provision in the clip approach to prevent gross excessive slack through deliberate or accidental manual maladjustment. Furthermore, the objectionable hazard of belt and buckle hanging out the door upon occupant disconnect and egress is completely unanswered in the absence of deliberate required manual repositioning of the clip to a retraction clearance position upon each disconnect.

BRIEF DESCRIPTION OF THE PRESENT INVENTION

The method of the present invention imposes snubbing of the webbing at a position intermediate the occupant and retraction force automatically in response to a relatively light back tension imposed by mere shoulder belt contact engagement with the occupant. Further retraction by the relatively heavy retraction force is thereby arrested without preventing further retraction upon any release or loosening of the back tension imposed by such shoulder belt engagement with the occupant. The back tension of such method is sufficiently light to entirely eliminate discomfort to the occupant while being responsive to slack upon release to cause completion of retraction from any position of extension. Such method eliminates the need for functional requirements and associated mechanism in the retractor of the present "state-of-the-art" comfort lock feature, such as outlined above, and avoids the requirement for door opening or other release mechanism for the comfort feature, as well as the potential for malfunctioning upon overextension in reaching by the occupant such as described above. In addition, the method assures belt retraction into actual contact engagement with the occupant under all circumstances so as to eliminate any slack associated with the conventional comfort feature contributing o lost motion in the effective application of a restraining force of the shoulder belt in an emergency. Finally, the method provides the advantage of completely automatic operation rendering unnecessary the manual extraction of the shoulder belt to set the comfort feature.

Preferred apparatus for implementing method of the present invention includes an attachment to a conventional static loop mounted on an automotive body pillar above the occupant's shoulder which is responsive to transition in shoulder belt webbing in use by an occupant between a slack condition, incident to disconnecting the belt or to an occupant returning from belt extending position to a normal seated attitude, and a condition where all slack is taken up with webbing in contact with occupant's chest under very light unobjectionable tension. In a first embodiment illustrated in the drawings, a pivoted lever having a fulcrum closely adjacent to the belt webbing at the top of its passage through the static loop is provided with a minimal extension for self-energized snubbing of the webbing against the static loop bar whenever the main body of the lever of substantial length is engaged by webbing projecting beyond the static loop under light tension upon elimination of slack during occupant's use. The fulcrum is yieldably mounted on the static loop body for displacement to a nonsnubbing position upon extraction of the belt while worn by the occupant. The lever is configured to hang loosely without snubbing contact in response to slack in the belt during retraction, or during extraction in a vertical direction with the fulcrum in its normal effective position.

The lever is preferably provided with a supplemental lightly preloaded lever yieldable under minor adjustments in the occupant's chest position to provide a slight "lost motion" in the light contact pressure operation of the belt before any extraction movement of the occupant encounters the relatively heavier resistance of the main retraction spring.

In a second embodiment, the lever is constructed with its short snubbing element pivotally connected to the actuating extension with a hinge type limit to a right angle relation in one direction with a light preloading torque spring yieldable to permit opening of the angle to accommodate the slight "lost motion" referred to above.

In a third embodiment, snubbing to arrest retraction upon light body contact of the webbing is accomplished in a roller-ramp unit having one-way self-energized snubbing action relieved by slack and fully released by extraction. The snubbing unit is pivotally connected to the static loop to accommodate belt angularity relative to the loop and the retractor extension of the belt webbing.

In a fourth embodiment, snubbing to arrest shoulder belt retraction responsive to take up of slack in light body contact is accomplished by a simple flexible leaf spring having a snubbing end through the slotted opening of a standard static loop within the slight clearance above the webbing and below the upper ridge extremity of the opening, employing such ridge as the snubbing fulcrum for a lever extension of the leaf spring when actuated by belt webbing in light body contact.

In another fifth embodiment, frictional resistance to shoulder belt retraction responsive to take-up slack into light body contact is provided with a slide device applied to the shoulder belt without direct connection to the static loop. After occupant has made belt connection, the slide is manually moved toward the static loop with surplus slack. Such surplus slack will be freely taken up by the retractor until the slide reaches contact with the static loop; and thereafter remaining slack will be taken up through the static loop until belt angle and back tension from light body contact activates slide resistance and imposes the required frictional resistance utilizing the belt projection angle, together with light back tension to sense the transition from slack to light body contact and to create an effective frictional resistance path for the belt webbing.

Upon disconnection, a cylindrical segment slot of approximately 90° provided in the slide for passing of the webbing aligns with the static loop guide during storage retraction while the belt is suspended vertically, providing in effect, one half of the 180° arcuate path for return to the retractor and imposing little if any additional frictional resistance to impede storage retraction.

DETAILED DESCRIPTION OF PREFERRED METHOD

Typical spring retractors may include extended retraction forces in excess of 3 lbs. A substantial variation in spring retraction force occurs upon progressive retraction. Ideally, the comfort feature of the present preferred method would automatically arrest retraction whenever and only when all slack is taken up with the belt engaging the occupant with insensible tension and without preventing further retraction upon any development of slack from occupant movement or disengagement of the shoulder belt. Elimination of minimum impedence is also desirable whenever slack arises so as not to delay any retraction required to take up the slack or return the belt to fully retracted condition.

A preferred approach, responsive to the transition between slack and occupant engaging condition of belt webbing, is actuated to provide snubbing with high mechanical advantage actuated by relatively light back tension whenever slack is eliminated in such transition while the belt webbing is projecting from the static loop toward occupant engagement.

DETAILED DESCRIPTION OF FIRST EMBODIMENT

With reference to the drawings, conventional static loop hanger 10 swivelly attached by bolt 11 to auto body pillar 12, is equipped with a shoulder belt having vertical webbing 13 extending to a conventional spring actuated retractor, having an inertial system for locking the belt against extraction under emergency deceleration conditions arising from accident or otherwise, and having an operative webbing extension 14 for passing over the shoulder and chest of the occupant to an attachment buckle normally including a further lap engaging extension of the belt to an attachment point of the retractor. Retraction and extension of the belt for occupant's use takes place in the vertical webbing 13 which is wound on a coiled spring actuated reel in the retractor.

In the application of the comfort feature attachment of the present invention, webbing 13 is normally under constant retraction tension, which may be in the order of 3 pounds or more to assure rapid retraction of the belt including the weight of the connector upon occupant's release, thereby avoiding any possibility of belt webbing hanging out of the door upon departure of the occupant.

Figure 5A:
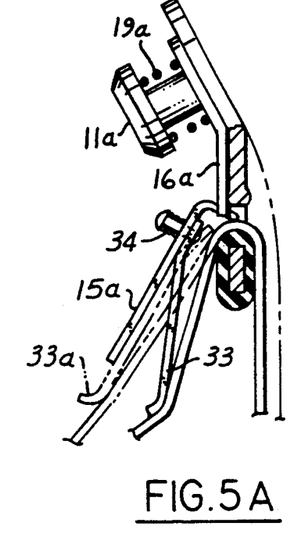
FIGS. 5A, 5B and 5C are views similar to FIGS. 3A, 3B and 3C illustrating a preferred modification.

The attachment of the present invention comprises snubbing lever 15 and fulcrum 16 attached by a pair of rivets 17 to a vertical position 18 of static loop 10 with springs 19 urging fulcrum 16 against spacing washer 20 and reaction stop 21 immediately above slot 22 for passage of belt webbing in static loop. As an alternative, illustrated in FIGS. 5A, 5B and 5C, the fulcrum 16a may be constructed with an extension for attachment by bolt 11a, instead of rivets 17, and made as a sheet metal element resiliently spring loaded, as by spring 19a, to its effective fulcrum position as shown in FIG. 5A. Such alternative will particularly facilitate attachment to a standard static loop without any modification or removal of the belt in order to accommodate "aftermarket" applications to cars which have no "comfort feature".

Figure 3A:
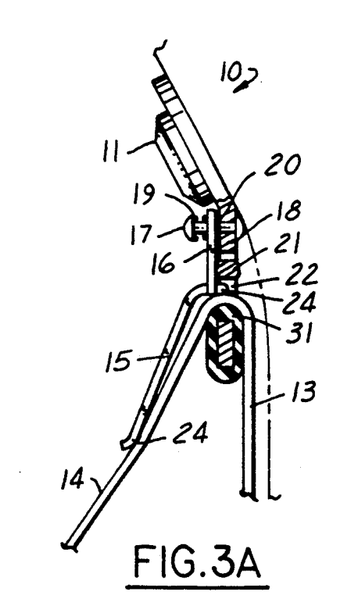
FIG. 3A is a partially sectioned side view of the FIG. 1 static loop illustrating the snubbing relation of the attachment.
Figure 3B:
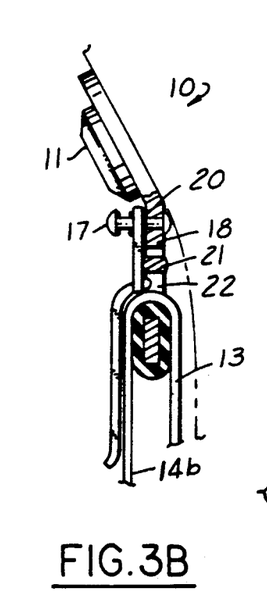
FIG. 3B is a view similar to FIG. 3A illustrating a slack nonsnubbing condition of the attachment.
Figure 4:
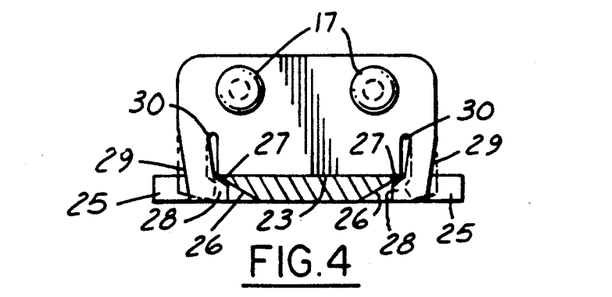
FIG. 4 is a sectional view of the lever and fulcrum subassembly per se shown in the complete assembly of FIGS. 1-3.

A pivotal connection between fulcrum 16 and snubbing lever 15, best illustrated in FIG. 4, includes fulcrum surface 23 immediately adjacent snubbing end 24 of lever 15 having a minimal extension beyond fulcrum surface 23 in order to maximize mechanical advantage of snubbing lever 15 from light contact pressure at lever end 24 from belt webbing 14 when worn by occupant with slack eliminated by contact with the occupant's chest. Since only a few thousandths of an inch displacement of snubbing end 24 is involved between complete freedom of contact and full snubbing of the belt webbing, adequate high mechanical advantage for actuation by completely comfortable back tension in webbing 14 can be accomplished with a relatively short lever arm 15, as well as complete freedom from snubbing contact with the webbing under slack belt conditions such as illustrated in FIG. 3B.

Manual extraction of belt webbing 14b in a vertical direction as shown in FIG. 3B can likewise be accomplished without any displacement of fulcrum 16 or frictional resistance by end 24 of the snubbing lever.

Figure 3C:
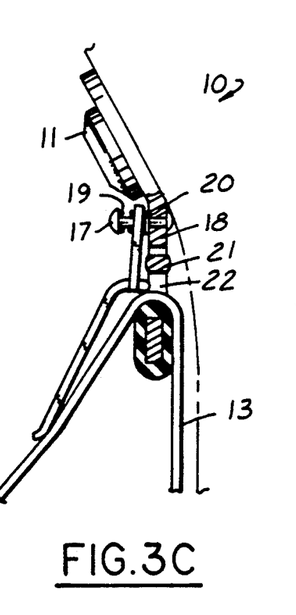
FIG. 3C is a view similar to FIG. 3A illustrating a nonsnubbing condition of the attachment during belt extraction while the webbing engages the snubbing lever.

With reference to FIG. 3C, extraction of the belt when in contact with lever 15, either by occupant movement or nonvertical manual extraction, is accommodated by yielding of fulcrum 16 against bias of spring 19 to move snubbing end 24 laterally out of compression contact with the adjacent webbing providing clearance displacement so that only frictional surface contact with snubbing lever 15 will be added to the normal resistance of retraction spring and static loop to the extraction of belt webbing, such as involved when the occupant moves to the glove compartment or other belt extending position or manually extracts belt webbing in a nonvertical direction.

Figure 5B:
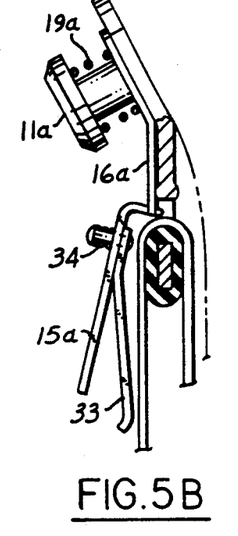
Figure 5C:
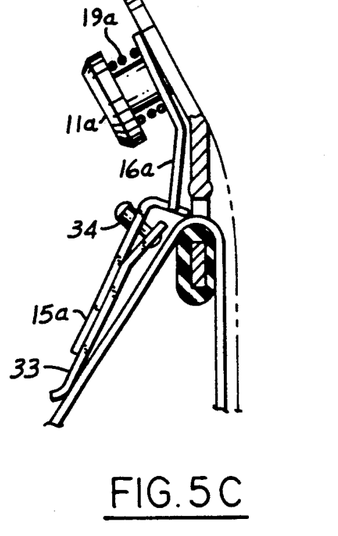
Figure 6:
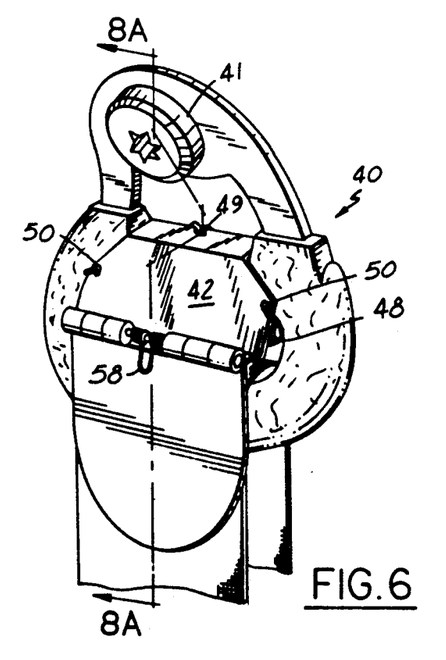
FIG. 6 is a perspective view similar to FIG. 2 illustrating a further preferred embodiment.
Figure 7:
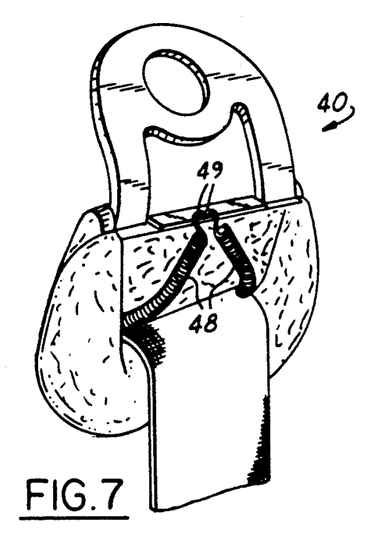
FIG. 7 is a rear perspective view of the static loop shown in FIG. 6.

A supplemental comfort feature may be, and preferably is, included by employing springs 19 or 19a with sufficient preload to resist fulcrum displacement to nonsnubbing clearance until extraction tension approaches retraction tension in webbing 13, and by employing lever means which will yield from an initial lightly preloaded effective snubbing position to accommodate minor occupant shifts in position without displacing the fulcrum from its effective snubbing position; for example, a supplemental lightly preloaded sheet metal lever 33, as illustrated in FIGS. 5A, 5B and 5C, with resilient means adapted to yield to permit "lost motion" in the light contact pressure snubbing operation of the belt. Such lost motion is illustrated in FIG. 5A by the relative solid line of lever 33, spaced from snubbing lever 15a, and phantom line 33a with lost motion taken up but with no displacement of snubbing lever 15a from its effective snubbing position. By this means, comfortable contact may be extended to cover minor occupant adjustments in sitting position without losing the safety of effective restraint upon sudden deceleration.

With reference to FIG. 4, in order to provide a pivotal connection between snubbing lever 15 and fulcrum 16 (15a and 16a in the case of FIGS. 5A-5C) closely adjacent the minimal snubbing extension 24, a loose but permanent connection is provided by lateral clearance slots 25 on either side of lever 15 having bevelled inner extremities 26 loosely engageable by matching bevelled ends 27 of slot engaging projections 28 below fulcrum surface 23 which are crimped into permanent assembled relation by compression of fulcrum edges 29 accommodated by slots 30. Adequate clearance for free pivotal movement of snubbing lever 15 relative to fulcrum 16 assures desired snubbing and free snubbing release operation with spring 19 provided to position fulcrum 16 in normal snubbing attitude as shown in FIGS. 3A and 3B. Such position is firmly maintained by retraction tension webbing 13 during normal snubbing action.

Figure 1:
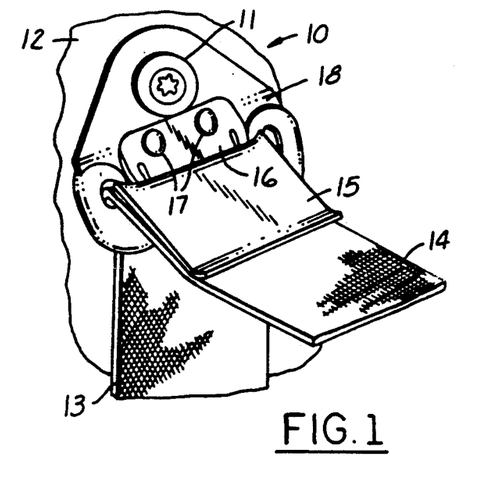
FIG. 1 is a perspective face view of a conventional static loop mounted on a passenger car pillar to which the attachment of the present invention has been applied.
Figure 2:
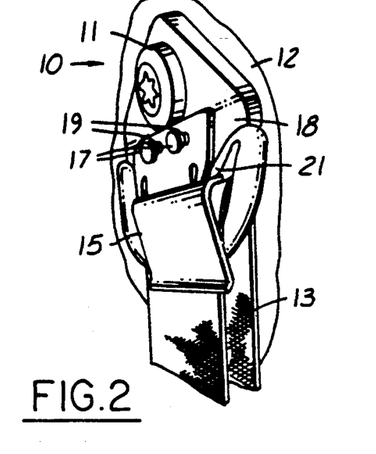
FIG. 2 is an oblique view of the static loop shown in FIG. 1 with belt webbing in slack condition.

As best shown in FIG. 1, snubbing lever 15 preferably extends the full width of belt webbing in order to minimize wear from snubbing engagement to match the conventional curvature in the static loop element 31 engaged by belt webbing so as to provide full snubbing contact across the width of the belt when extended in normal occupant engaging attitude.

DETAILED DESCRIPTION OF SECOND EMBODIMENT

With reference to FIGS. 6-14, a preferred embodiment includes elements and functions similar to the modification of FIGS. 5A, 5B, and 5C adapted to a similar static loop 40 in a manner permitting attachment, if desired, without removing pillar bolt 41 premounted in a conventional manner. Fulcrum 42 is formed as a sheet metal stamping with angled surfaces 43 and 44 accurately matched molded planar surfaces 45 and 46 respectively of plastic body 47. Fulcrum 42 is retained in operative position, as shown in FIGS. 8A and 8B by a pair of closely wound preload springs 48 passing through upper end extremities of the loop webbing passage connected at upper center 49 and either side edge 50 of fulcrum 42 with preload tension. The operative position of the fulcrum is retained unless and until extraction tension on the occupant side of the webbing 49 approaches retractor tension on the webbing 50 which is calibrated to overcome the preload of springs 48 with slight displacement of fulcrum 42, as illustrated in FIG. 8C, and eliminate compressive snubbing of webbing 49 against adjacent surface 51 of static loop body 52.

Figures 8A, 8B, 8C:
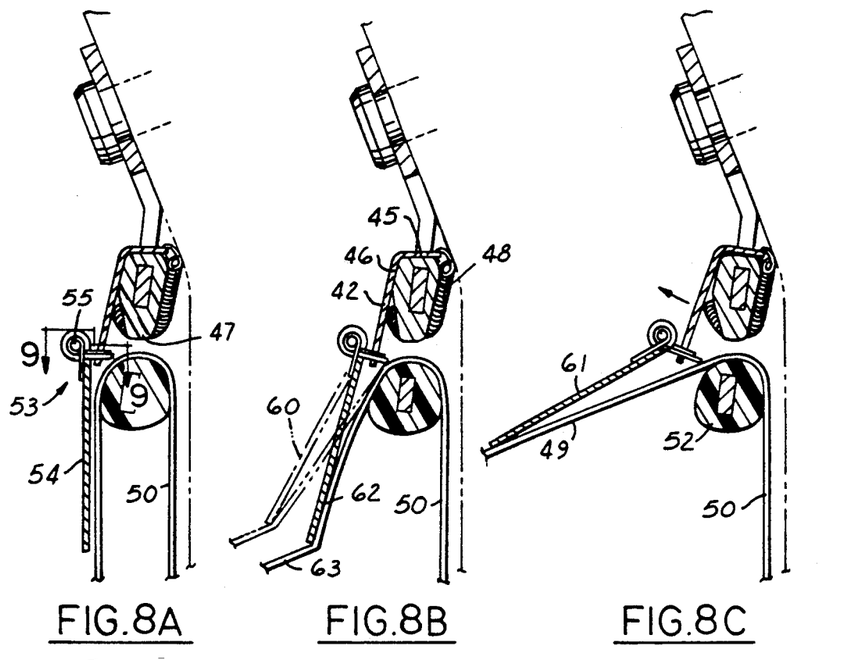
FIG. 8A is a sectional view taken along the line 8—8 of FIG. 6 illustrating the belt webbing in slack condition.
FIG. 8B is a sectional view taken along the line 8—8 of FIG. 6 illustrating the snubbing relation of the attachment.
FIG. 8C is a sectional view taken along the line 8—8 of FIG. 6 illustrating a nonsnubbing condition of the attachment during belt extraction while the webbing engages the snubbing lever.

Snubbing assembly 53 comprises lever 54 hinged at 55 to a pair of snubbing elements 56 with torque spring 57 mounted on the hinge pin having loop 58 engaging lever 54 and ends 59 engaging snubbing elements 56 preloading them to a right angle hinge limit position as shown in FIG. 8A, but yieldable to a hinge opening position as shown at phantom position 60 and extraction position 61 in FIGS. 8B and 8C. The preload of torque spring 57 is calibrated to resist any hinge opening until effective snubbing takes place, as illustrated at 62 in FIG. 8B, preventing any further retraction by retractor tension in belt webbing 50 while leveraged light occupant engaging tension prevails in belt webbing 63. Multiple coils in torque spring 57 provide a low spring rate so that negligible added belt tension is felt by the occupant in actuating lever 54 from initial snubbing position 62 to hinge opening positions, such as shown at 60 and 61, so as to accommodate minor adjustments in an occupant's seating position.

When belt extraction is required, as illustrated in FIG. 8C, e.g. in reaching for the glove compartment or otherwise, full retractor tension in webbing 50 is overcome with relief of webbing compression at surface 51 minimizing frictional resistance incident to webbing contact with snubbing elements 56. Upon return of the occupant to normal seated position, the extra webbing extracted will assume a slack condition without effective tension on lever 54 permitting automatic retraction until slack is taken up and light body tension is reimposed, as on webbing 63, to again effect snubbing under light body contact of the webbing.

It will be noted that manual extraction of the belt in a vertical direction, as illustrated in FIG. 8A, may be accomplished without any frictional impedance by the snubbing elements, for example in preparing for initial buckle connection, after which slack will automatically be taken up as described above.

Figure 9:
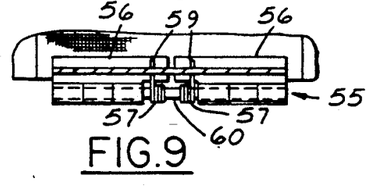
FIG. 9 is a fragmentary sectional view taken along the line 9—9 of FIG. 8A.
Figure 10:
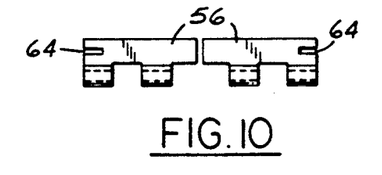
FIG. 10 is a detail view of the snubbing elements per se shown assembled in FIG. 9.
Figures 11, 13, 14:
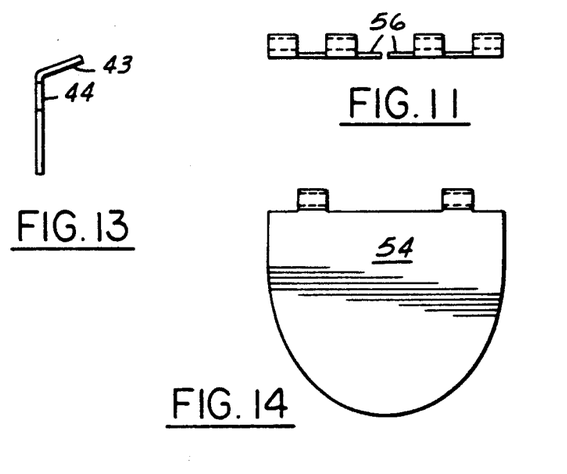
FIG. 11 is a front elevation of the snubbing elements per se illustrated in FIG. 10.
FIG. 13 is a side elevation of the snubbing element illustrated in FIG. 12.
FIG. 14 is a front elevation of the actuating lever per se illustrated in assembled relation in FIGS. 6, 8A, 8B, and 8C.
Figure 12:
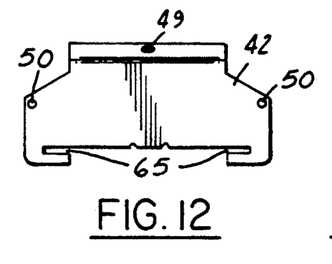
FIG. 12 is a front elevation of the fulcrum element per se illustrated in assembled relation in FIGS. 6, 8A, 8B and 8C.

As best illustrated in FIGS. 9-11, dual snubbing elements 56 are provided in order to accommodate assembly interengagement of slots 64 with fulcrum slots 65 prior to insertion of hinge pin 66. Respective slots 64 and 65 are dimensioned to accommodate required pivotal actuation by lever 54, as between respective positions illustrated in FIGS. 8A and 8B. Such pivotal movement of snubbing elements 56 is limited, however, by interslot engagement to prevent complete closing of the hinged elements 54 and 56 to their 90° relationship under belt extraction such as illustrated in FIG. 8C. This provides positive assurance that snubbing elements 56 will return to effective snubbing attitude, as illustrated in FIG. 8B, upon any belt extraction followed by return of the occupant to normal seated position.

While the respective comfort feature elements—fulcrum 42, lever 54 and snubbing elements 56—are constructed as relatively simple stampings, tolerance factors are important in order to assure optimum performance consistency, with minimum occupant contacting belt tension, minimum displacement of lever 54 to effective snubbing position, accommodation for minor adjustment in body position without webbing extraction, minimum resistance to required webbing extraction and minimum interference with belt retraction when the buckle is disconnected. While only a few thousandths of an inch in the displacement of the snubbing edge of elements 56 is involved between effective snubbing and free passage of the webbing, additional clearance for transition between the conditions of FIGS. 8A and 8B is required to accommodate tolerances for the several related elements within production accuracy of precision stampings and the molded portions of the static loop. In this connection, the ratio of length of lever 54 to the projection of snubbing elements 56 beyond slots 64 provides the mechanical advantage for minimizing occupant contacting belt tension. A balancing of such ratio with the required displacement of the snubbing elements to accommodate practical tolerance stack up may be readily achieved through careful precise dimensioning of the respective parts.

From the foregoing description, it will be understood that the embodiments disclosed achieve substantially all of the objectives of the method in eliminating any interference with shoulder belt retraction, minimizing belt tension in contact with the occupant, accommodating extraction for initial buckle attachment and occupant movement to a belt extending position, automatic snubbing with belt webbing in occupant contact without slack, and automatic release of snubbing in response to any slack condition.

It will also be understood that through the simple expedient of adding the disclosed lever/fulcrum attachment to a conventional static loop, the provisions of 65 "comfort feature" mechanism in the retractor, together with door opening responsive release mechanism, are dispensed with while solving all problems incident to excessive slack arising from either too loose manual setting or unintended latching in an excessive extended condition.

DETAILED DESCRIPTION OF THIRD EMBODIMENT

With reference to FIGS. 15-20, snubbing unit 66, comprising roller 67 and snubbing element 68, is pivotally suspended by spring wire 69 from central mounting retainer 70 seated on static loop 71, pivotally anchored on pillar bolt 72.

Figure 15:
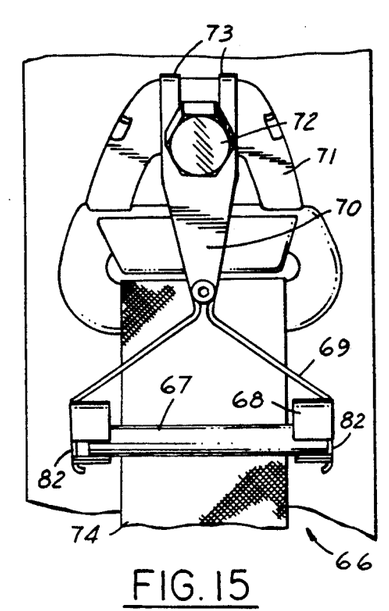
FIG. 15 is a front elevation of the third embodiment under disconnected belt retraction condition.
Figure 16:
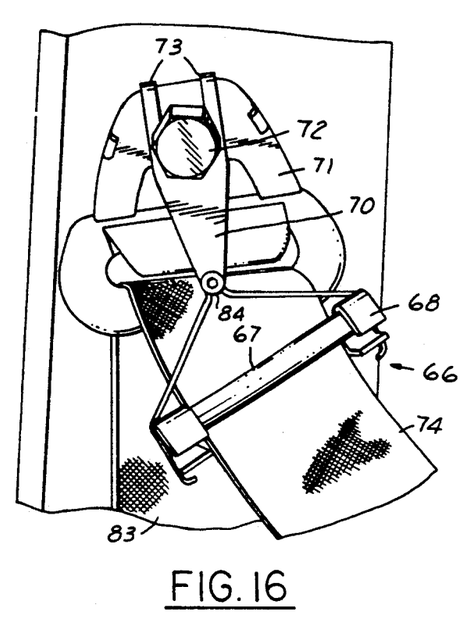
FIG. 16 is a front elevation of the preferred embodiment illustrating a snubbing condition with the belt in use.
Figure 17:
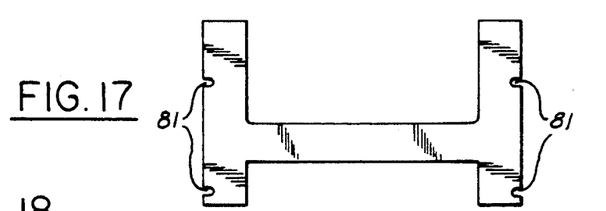
FIG. 17 is a plan view of a flat blank metal stamping prior to forming for the snubbing element of the preferred embodiment.
Figure 18:
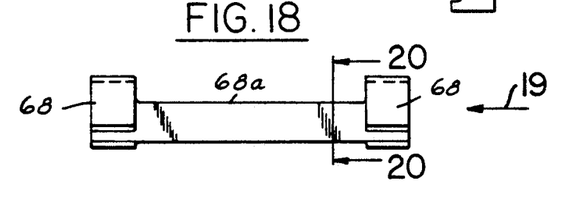
FIG. 18 is a front view of the stamping of FIG. 17 after forming.
Figure 19:
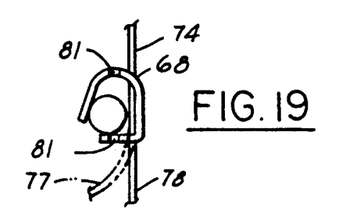
FIG. 19 is an end view of the stamping of FIG. 18, with roller element added, illustrating nonsnubbing relation with the belt webbing under disconnected retraction or slack condition.
Figure 20:
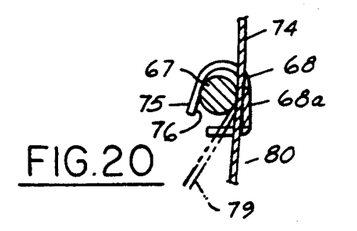
FIG. 20 is a sectional view along the line 20—20 of FIG. 18 with roller added and self-energized into snubbing relation by webbing retraction under light tension.

Retainer 70 is slotted to slide over the bolt shank under its head without removal and is located and retained against pivoting relative to static loop 71 by flange ends 73 as illustrated in FIG. 15. Roller 67 reaches a lower clearance position relative to belt webbing 74 when disconnected for retraction as well as for extraction under a requirement for initial buckling or reaching by the user. FIG. 16 illustrates a snubbing condition of roller 67 relative to snubbing element 68 while the belt webbing extends over the user's shoulder in normal sitting position. In such position roller 67 snubs webbing 74 against transverse strip 68a extending back of webbing 74 between element ends 75 as shown in FIG. 20. Each of ends 75 includes a ramp surface 76 extending at a nonbinding release angle relative to strip 68a per se. Such nonbinding angle permits any slack condition in webbing 74, such as illustrated at 77 in FIG. 19, to relieve the snubbing action and permit retraction until the slack is taken up with the belt webbing under light tension, as shown at 79 in FIG. 20 which actuates roller 67 in a self-energizing snubbing direction.

By providing an appropriate near but nonbinding ramp angle, e.g., 17° with typical materials, a slight reduction in effective contact angle of belt webbing under relatively light back tension, such as indicated at 80 in FIG. 20, will be sufficient to induce relatively high self-energized one-way snubbing against retraction tension, subject to free release for belt extraction and nonbinding return retraction until slack is taken up. Upon disconnecting the belt buckle, as in leaving the vehicle, vertical disposition of the webbing, as shown at 78 in FIG. 19, assures free unrestricted passage through snubbing unit 66 for rapid retraction to avoid any possibility of the belt hanging out at the door opening.

In attaching snubbing unit 66 to belt webbing 74, grooves 81 accommodate spring wire ends 82, initially disconnected from snubbing element 68 placed back of webbing 74 while roller 67 is inserted from one end. Wire ends 82 are then sprung apart for engagement with grooves 81 on ends of element 68 which maintain proper orientation and retain roller 67 within snubbing unit 66.

As illustrated in FIG. 16, static loop 71 pivots to an angle halfway between that of webbing 74, extending over the user's shoulder and webbing 83 extending down to the retractor, while wire pivot 84, centered at belt level passing through loop 71 permits snubbing unit 66 to follow fully any angularity of webbing 74 extending to the user. This permits the snubbing action to take place independent of the static loop, or the condition of the belt webbing in passing through such loop, other than to serve as a reaction point at wire pivot 84. Resilience of spring wire 69 accommodates limited body shifting without incurring resistance of retractor tension or displacement of belt snubbing engagement.

Retrofitting on existing vehicles is accommodated by simple insertion of retainer 70 under the head of pillar bolt 72 and connection of wire ends on snubbing element 68. Any existing "window shade" latching can be permanently disabled by simply cutting off the door opening responsive plunger.

Under typical test measurements, a retraction tension sufficient to produce twelve ounces of normal pressure against a wearer's chest in the absence of comfort feature was reduced to two ounces with the snubbing action of the subject "soft touch" comfort feature. Furthermore, relative to "window shade" comfort features, now discontinued on 1990 model U.S. vehicles, no manual setting is required; and no possibility of hazardous over-slack condition exists. Thus, both voluntary and mandatory use of safe effective shoulder restraint safety belts can be further encouraged.

DETAILED DESCRIPTION OF FOURTH EMBODIMENT

Figures 21, 22, 25:
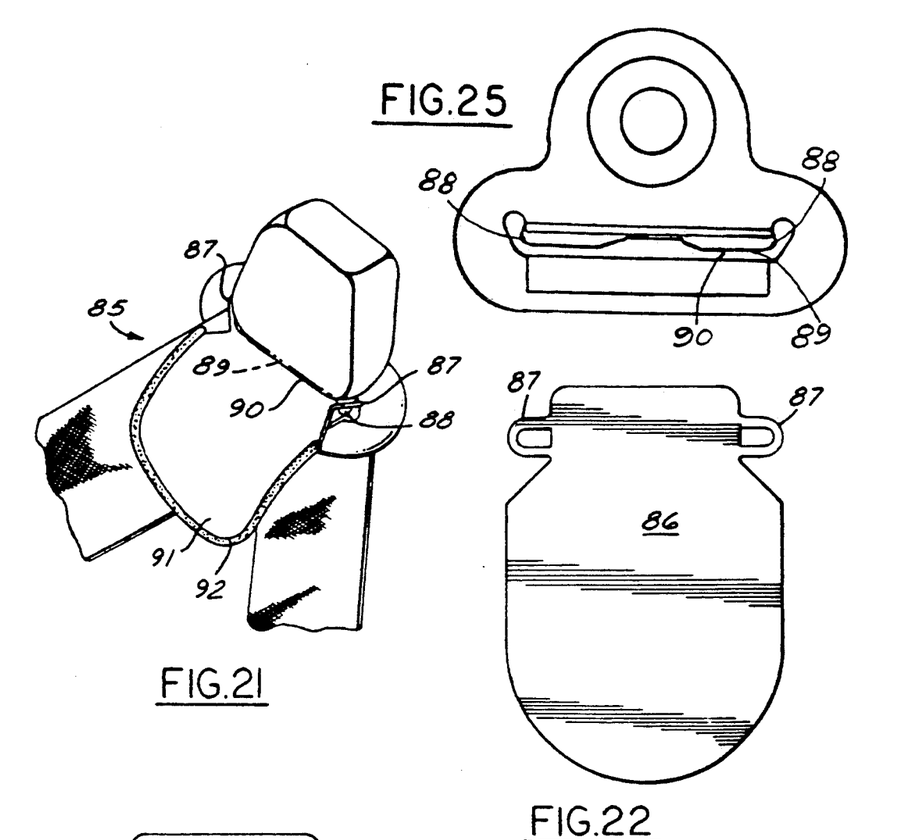
FIG. 21 is a front elevation of a second preferred embodiment illustrating a snubbing condition with the belt in use.
FIG. 22 is a plan view of a flat metal stamping prior to forming into the snubbing element of the FIG. 21 embodiment.
FIG. 25 is a face view of a standard prior art static loop per se corresponding to that shown in the assemblies of FIGS. 21 and 24.

With reference to FIGS. 21 and 22, snubbing unit 85 comprises a simple leaf spring formed from a flat, thin, typically 0.006", spring steel stamping 86 having projecting ears 87 slotted to engage ends 88 of ridge 89 at the upper extremity of slot 90 serving as the snubbing fulcrum for leaf spring lever 91.

Curvature of the leaf spring in the fulcrum area is provided with a radius slightly exceeding the adjacent surface of webbing passing through slotted opening, such as to provide free clearance in the absence of snubbing actuation of the lever with minimum articulation of the lever against the fulcrum ridge to provide snubbing engagement upon actuation of the lever by the webbing under light body contact. Flexible rubber or plastic edging 92 is provided as occupant protection from the thin metal edge extremities. The thin metal provides sufficient flexibility for extraction of the belt, even if raised up to a horizontal direction, without permanent deformation of the spring curvature.

Figures 23, 24:
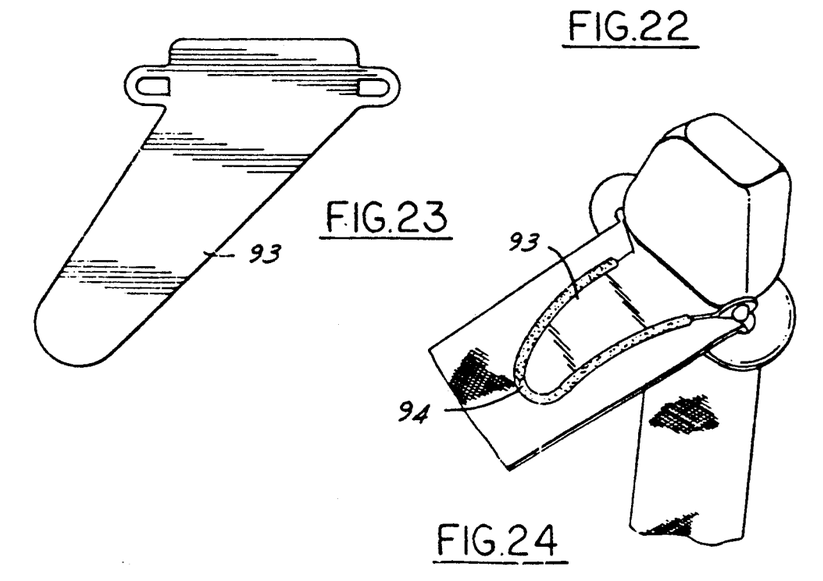
FIG. 23 is a plan view of an alternative flat metal stamping prior to forming for an alternative snubbing element similar to the FIG. 21 embodiment.
FIG. 24 is a perspective view of the FIG. 23 leaf spring with a formed curvature appropriate for installed use.
Figure 26:
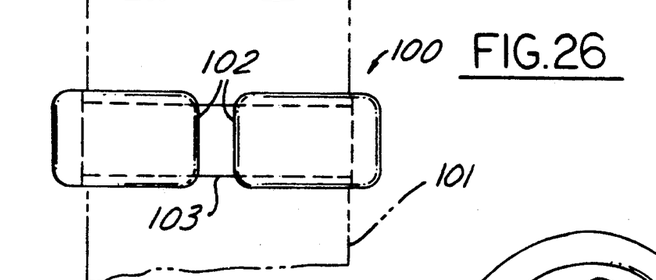
FIG. 26 is a face view of the slide device of a further embodiment applied to the webbing of a shoulder belt.

With reference to FIG. 23, a left-right version of spring lever 93 may be provided to extend in the direction of belt extraction into body contact when in use and to virtually eliminate or minimize any frictional contact with the webbing during vertical retraction, which might in any way impede or slow retraction of the belt upon disconnection. In this case, as shown in FIG. 24, lever 93 is formed with a curvature substantially limiting the actuating contact with the webbing to end 94 while in body contact with effective snubbing actuation, while freeing the webbing from such contact during vertical belt retraction.

Advantages of the embodiments of FIGS. 21–24, include simplicity of construction with a single leaf spring element providing effective snubbing, light body contact, take-up of slack to assure body contact, free retraction, and flexibility for extraction. On static loops with the configuration shown having a slot limiting ridge 89, the snubbing unit may be installed by simply deflecting the ears 87 to snap into engagement with ridge ends 88, serving to locate the unit laterally as well as in the direction of webbing movement during extraction and retraction. Such construction will accommodate retrofit on vehicles equipped with the appropriate static loop having no comfort feature, where full retraction force of the belt is otherwise felt by the occupant.

As mentioned above, with reference to FIG. 24, the curvature illustrated for left-right spring 93 effectively emphasizes and limits the end contact for engagement with belt webbing during occupant use with belt extension in a corresponding direction and with the curved end extremity substantially bypassed during belt retraction in a vertical direction. Such provision further accommodates effective snubbing against retraction during use by the occupant with freedom against frictional contact during retraction of the belt in a vertical condition.

DETAILED DESCRIPTION OF FIFTH EMBODIMENT

With reference to FIGS. 26–30, a single piece 100, or optionally two-piece 100a, slide device is applied to belt webbing 101 by entering outer edges of the webbing into arcuate slots 102 on either side of central opening 103, which, when spread to full width as shown, slidably secures the device for permanent use.

Figure 27:
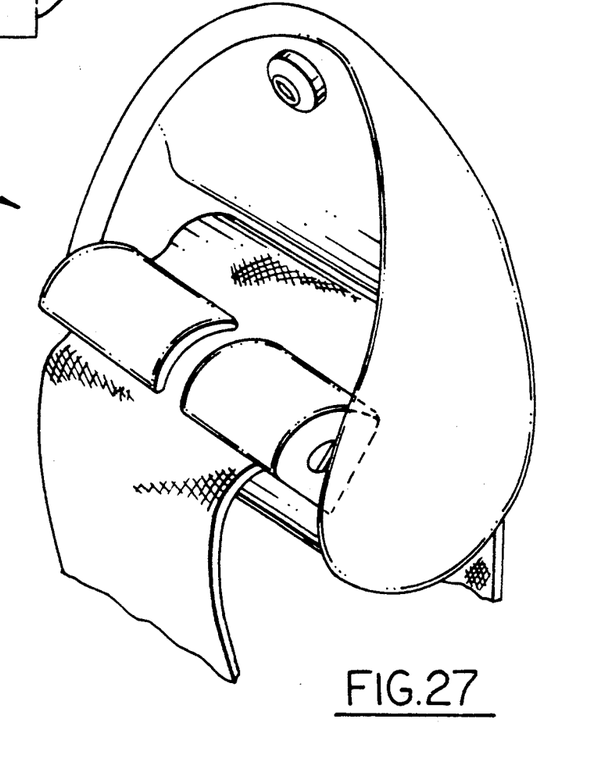
FIG. 27 is a perspective view of the slide device in reactive engagement with a static loop after slack is taken up.

Upon connection of the belt with its lap portion in effective restraint contact, and shoulder portion with extended surplus slack, slide 100 is manually moved toward static loop 104 leaving clearance less than the length of surplus slack. In retraction of surplus slack, slide 100 reaches and reacts against loop 104 as shown in FIG. 27 with frictional resistance established by slack take-up under belt angle and back tension of light body contact. Occupant extension of the shoulder belt to reach the glove compartment or otherwise will not be resisted or change the position of the slide on the belt which will return to its snubbing position upon return of the occupant to previous established sitting position.

Figure 28:
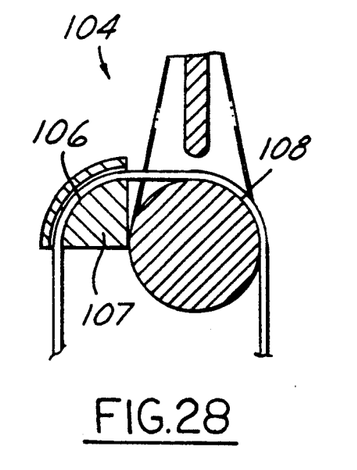
FIG. 28 is a sectional view showing the slide device in registration with the static loop to accommodate storage retraction.
Figure 29:
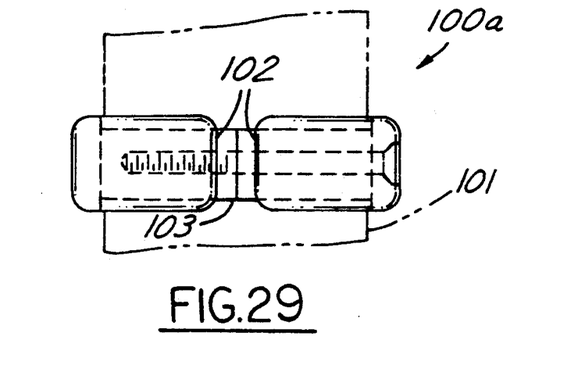
FIG. 29 is a view similar to FIG. 26 illustrating the slide constructed as a two piece element.
Figure 30:
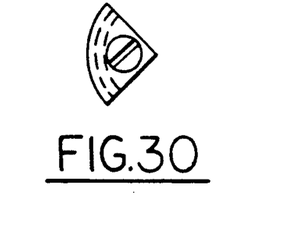
FIG. 30 is an end view of the slide shown in FIG. 29.

With reference to FIG. 28, it will be seen that the 90° arc 106 of slide body 107 compliments a corresponding arc 108 of loop 104 and in effect, provides one half of the 180° arc path for the belt's return to the retractor, adding little if any frictional resistance to impede storage retraction.

I claim:

1. A vehicle shoulder belt restraint assembly comprising:
    a safety belt;
    a safety belt retractor, said safety belt retractor being wound into said retractor and having one end connected to the retractor and a free end, said retractor including means for imposing a retraction tension upon the belt to wind the belt into the retractor and further including an inertia actuated means for locking said retractor against retraction of sad safety belt in a sudden deceleration;
    a static loop adapted to be mounted to a vehicle body and including a slot, said safety belt passing through said slot for guiding the safety belt between said retractor and a buckle connecting the free end of the safety belt to the vehicle; and
    comfort means connected to the static loop and for permitting take up of slack in the belt when tension in the belt is a slack tension, which is less than the retraction tension, snubbing the belt to provide frictional resistance to retraction and thereby limit the retraction tension force between the static loop and the free end of the belt in response to a retraction tension in the belt between slack tension and a high belt tension, and releasing said snubbing in response to the belt tension, and releasing said snubbing in response to the belt tension exceeding said retraction tension and in response to the belt tension falling below said retraction tension.

2. Restraint means of claim 7 wherein said comfort means includes means for pressing said belt webbing into frictional engagement with an element of said static loop.

3. Restraint means of claim 2 wherein said comfort means includes a pivoted lever having a snubbing end next to said element, and a lever arm of substantial length in contact with the belt when in use, said snubbing means also including a lever fulcrum displaceably mounted on said loop and provided adjacent the snubbing end next to said element.

4. Restraint means of claim 3 wherein said fulcrum is positioned to provide free webbing clearance between said element and snubbing end in response to vertical slack belt condition.

5. Restraint means of claim 4 wherein said comfort feature means includes resilient mounting means (19) next to said element (31) for said fulcrum with said pivoted lever to provide belt webbing clearance displacement (FIG. 3C) for said snubbing end (24) relative to said element upon extraction of said belt webbing while in contact with said lever arm.

6. Restraint means of claim 5 including means to preload said resilient mounting means to resist said clearance displacement until extraction effort exceeds said retraction tension, and wherein supplemental preloaded resilient means is included for said lever arm which will yield from an initial effective snubbing position under limited occupant adjustment of sitting position without displacing said fulcrum from its effective snubbing position.

7. Restraint means of claim 1, wherein said comfort feature means includes snubbing means comprising a snubbing lever (15, 15a) connected to the loop element including a snubbing end (24) for compressing the belt webbing against said element, a displaceably mounted fulcrum (16, 16a) for said snubbing lever on said hanger, and a spring (19, 19a) yieldably preloading the fulcrum (16, 16a) in its operative position for effecting snubbing subject to displacement of said fulcrum with snubbing lever to an inoperative position upon belt extraction overcoming said retraction tension.

8. Restraint means of claim 1 wherein said comfort means includes a snubbing unit (66) pivotally connected (84) to said static loop, said unit comprising roller and snubbing elements (67, 68a) with shoulder engaging webbing (74) extending between said elements (67, 68a).

9. Restraint means of claim 8 wherein said snubbing unit includes ramp means (68) engaged by said roller (67) comprising roller wedging snubbing means responsive to webbing retraction.

10. Restraint means of claim 8 wherein said snubbing element is pivotally mounted with a spring wire connection accommodating lateral pivotal movement relative to said static loop.

11. Restraint means of claim 8 wherein said pivotal mounting is provided by retainer means mounted under a head of a static loop mounting bolt.

12. Restraint means of claim 1 wherein said comfort means comprises a single flexible leaf spring element pivotally connected to said static loop to provide said frictional resistance upon slack take-up, said static loop having ridge serving as a fulcrum for said leaf spring.

13. Restraint means of claim 12 said leaf spring element further including a snubbing means projection of said leaf spring extending beyond said ridge and an actuating lever means portion of said leaf spring engaged by the webbing during light body contact to provide said frictional resistance.

14. Restraint means of claim 13 wherein said leaf spring is provided with projecting apertured ear means engaging said slot limiting ridge end projections for locating and retaining said snubbing means on said static loop.

15. Restraint means of claim 13 including superimposed protective edging around an exposed perimeter of the actuating lever portion of said leaf spring.

16. A vehicle shoulder belt restraint assembly comprising:
   a safety belt;
   a safety belt retractor, said safety belt retractor being wound into said retractor and having one end connected to the retractor and a free end, said retractor including means for imposing a retraction tension upon the belt to wind the belt into the retractor and further including an inertia actuated means for locking said retractor against extraction of sad safety belt in a sudden deceleration;
   a static loop adapted to be mounted to a vehicle body and including a slot, said safety belt passing through said slot for guiding the safety belt between said retractor and a buckle connecting the free end of the safety belt to the vehicle; and
   comfort means slidably mounted on the safety belt and for permitting take up of slack in the belt when tension in the belt is a slack tension, which is less than the retraction tension, snubbing the belt to provide frictional resistance to retraction and thereby limit the retraction tension force between the static loop and the free end of the belt in response to a retraction tension in the belt between slack tension and a high belt tension, and releasing said snubbing in response to the belt tension exceeding said retraction tension and in response to the belt tension falling below said retraction tension, said comfort means including a generally quarter-circular member having generally perpendicular, planar faces and having an arc shaped slot therein which beings in one planar face and ends in the other planar face, said safety belt passing through said arc shaped slot.

* * * * *